United States Patent
Hojo

(10) Patent No.: US 9,749,479 B2
(45) Date of Patent: Aug. 29, 2017

(54) IMAGE FORMING APPARATUS TO RECOGNIZE A CHANGE OF STATE OF THE IMAGE FORMING APPARATUS

(71) Applicant: CANON KABUSHIKI KAISHA, Tokyo (JP)

(72) Inventor: Yuta Hojo, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 14/352,653

(22) PCT Filed: Oct. 15, 2012

(86) PCT No.: PCT/JP2012/006592
§ 371 (c)(1),
(2) Date: Apr. 17, 2014

(87) PCT Pub. No.: WO2013/057915
PCT Pub. Date: Apr. 25, 2013

(65) Prior Publication Data
US 2014/0300932 A1 Oct. 9, 2014

(30) Foreign Application Priority Data
Oct. 19, 2011 (JP) .................. 2011-230003

(51) Int. Cl.
*G06K 15/00* (2006.01)
*G06F 3/12* (2006.01)
(Continued)

(52) U.S. Cl.
CPC ..... *H04N 1/00095* (2013.01); *G03G 15/5004* (2013.01); *H04N 1/00896* (2013.01)

(58) Field of Classification Search
CPC ........... G03G 15/5004; G03G 15/5012; G03G 15/55; G03G 15/65; G03G 15/70; G03G 15/80; G03G 15/6502; G03G 15/6508; G03G 15/50; G03G 15/553; G06F 1/3284; G06F 1/1221; G06F 1/1229; G06F 3/121; G06F 3/1229; G06F 3/1234; H04N 1/00885; H04N 1/00896; H04N 1/00904;
(Continued)

(56) References Cited

U.S. PATENT DOCUMENTS 6,363,227 B1 * 3/2002 Serizawa .............. G06F 3/1207
358/296
7,120,372 B2 * 10/2006 Kim .................... G03G 15/5004
399/43
(Continued)

FOREIGN PATENT DOCUMENTS

JP       9-185294 A      7/1997
JP    2005-271356 A    10/2005
(Continued)

*Primary Examiner* — Mohammad Ghayour
*Assistant Examiner* — Jonathan R Beckley
(74) *Attorney, Agent, or Firm* — Canon U.S.A., Inc. IP Division

(57) ABSTRACT

A state change of a status occurred during a communication interrupted state is stored as a state change status. Thus, a video controller 102 can recognize the change of the status during a period when communication between the video controller 102 and an engine control unit 103 is interrupted, based on the state change status.

9 Claims, 12 Drawing Sheets

(51) Int. Cl.
*H04N 1/00* (2006.01)
*G03G 15/00* (2006.01)

(58) Field of Classification Search
CPC ........... H04N 1/00891; H04N 1/00888; Y02B 60/1267; Y02B 60/32; G06K 15/406; G06K 15/4055; G06K 15/4025; G06K 15/402; G06K 15/408; G06K 15/409
USPC ............. 358/1.13–1.15; 399/88, 70, 75, 37; 713/300, 323, 320, 324
See application file for complete search history.

(56) References Cited

U.S. PATENT DOCUMENTS

| | | | | |
|---|---|---|---|---|
| 7,283,262 B2* | 10/2007 | Takeda | .................... | G06K 15/00 |
| | | | | 358/1.13 |
| 7,334,146 B2* | 2/2008 | Kobayashi | ......... | H04N 1/00885 |
| | | | | 712/228 |
| 7,474,431 B2* | 1/2009 | Yamano et al. | ............. | 358/1.15 |
| 7,755,779 B2* | 7/2010 | Miura | ................ | H04N 1/00209 |
| | | | | 358/1.13 |
| 7,822,354 B2* | 10/2010 | Hayakawa | ......... | G03G 15/5004 |
| | | | | 250/208.1 |
| 7,890,784 B2* | 2/2011 | Katoh | .................. | H04N 1/2158 |
| | | | | 713/300 |
| 8,351,801 B2* | 1/2013 | Naruse | ................ | G03G 15/5004 |
| | | | | 399/45 |
| 8,599,412 B2* | 12/2013 | Narushima | ............ | G06F 1/3284 |
| | | | | 358/1.14 |
| 8,635,474 B2* | 1/2014 | Hayakawa | ......... | G03G 15/5004 |
| | | | | 713/320 |
| 8,823,973 B2* | 9/2014 | Takahashi | .......... | G03G 15/5004 |
| | | | | 358/1.14 |
| 8,864,125 B2* | 10/2014 | Mizuno | .................... | B65H 1/00 |
| | | | | 271/145 |
| 2004/0004732 A1* | 1/2004 | Takeda | .................. | G06K 15/00 |
| | | | | 358/1.13 |
| 2004/0146313 A1* | 7/2004 | Uchizono | ............ | G03G 15/5004 |
| | | | | 399/75 |
| 2004/0239976 A1* | 12/2004 | Takahashi | ................ | B41J 29/38 |
| | | | | 358/1.14 |
| 2009/0310177 A1* | 12/2009 | Takahashi | .......... | G03G 15/5004 |
| | | | | 358/1.15 |
| 2015/0055971 A1* | 2/2015 | Totsuka | .......................... | 399/75 |

FOREIGN PATENT DOCUMENTS

| | | |
|---|---|---|
| JP | 2007-336142 A | 12/2007 |
| JP | 2009-265134 A | 11/2009 |
| JP | 2010-130163 A | 6/2010 |
| JP | 2011-193113 A | 9/2011 |
| JP | 2011-197127 A | 10/2011 |

* cited by examiner

FIG.8

|  | CASSETTE STATE | PAPER SURFACE DETECTION STATE | PAPER PRESENCE DETECTION STATE | INITIAL VALUE |
|---|---|---|---|---|
| 801 | NOT PRESENT | — | — | NO CHANGE |
| 802 | PRESENT | NOT PRESENT | NOT PRESENT | UNDEFINED |
| 803 | PRESENT | NOT PRESENT | PRESENT | UNDEFINED |
| 804 | PRESENT | PRESENT | NOT PRESENT | NO CHANGE |
| 805 | PRESENT | PRESENT | PRESENT | NO CHANGE |

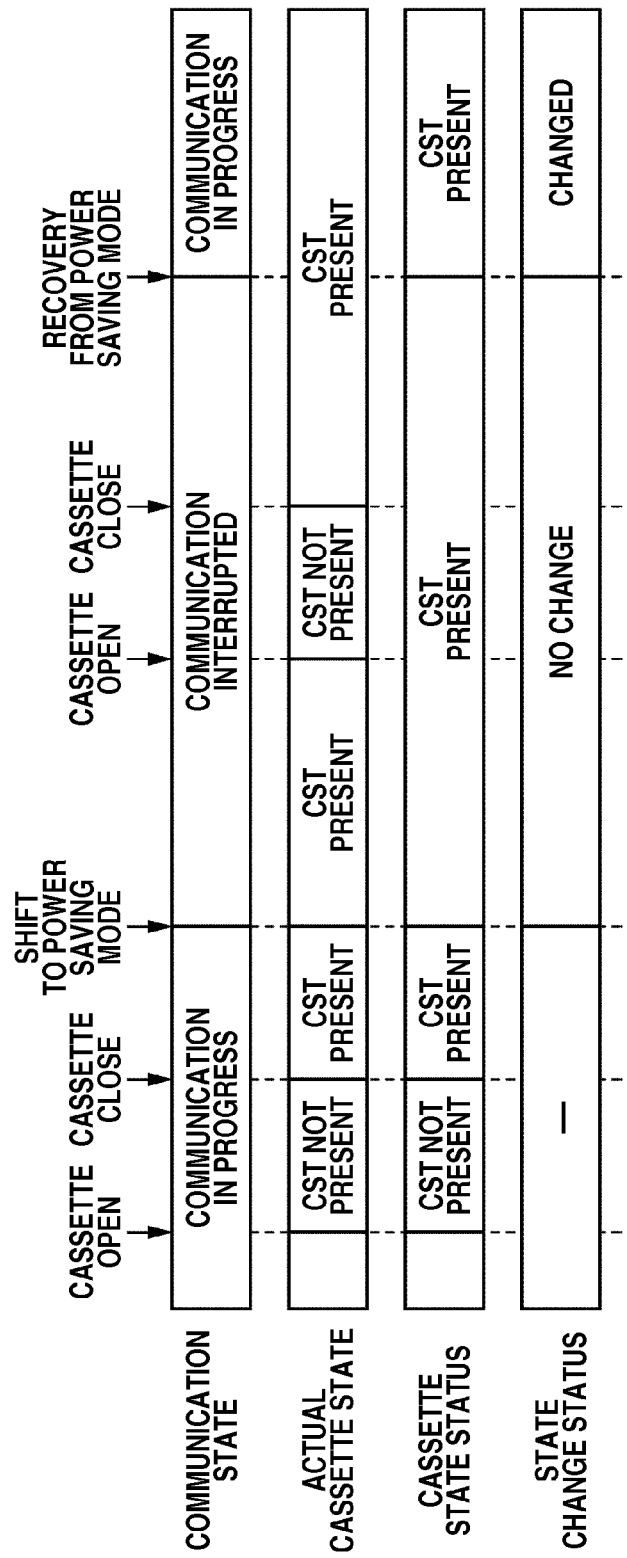

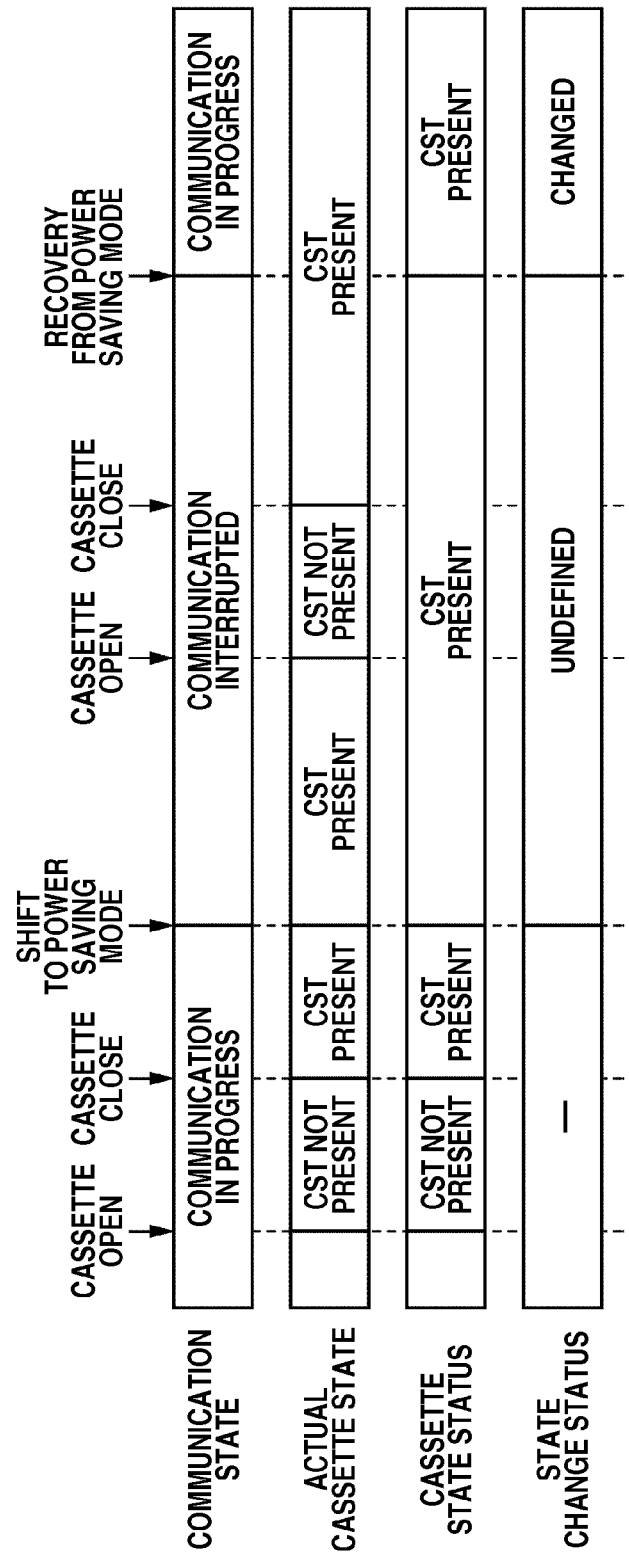

IMAGE FORMING APPARATUS TO RECOGNIZE A CHANGE OF STATE OF THE IMAGE FORMING APPARATUS

TECHNICAL FIELD

The present invention relates to a communication control for an image forming apparatus that forms an image on a recording material.

BACKGROUND ART

An image forming apparatus including a video controller and an engine control unit, each serving as a control unit, is conventionally known. The video controller and the engine control unit can communicate with each other. If the engine control unit detects a change in an operational state of the image forming apparatus, the engine control unit notifies the video controller of the detected state change. Then, if the video controller receives the notification informing the occurrence of a state change, the video controller acquires information indicating detailed contents of the change having occurred in the image forming apparatus and performs control to synchronize the video controller with the engine control unit based on the acquired information. For example, according to a method discussed in Japanese Patent Application Laid-Open No. 9-185294, an engine control unit transmits a state change notification signal informing a state change having occurred in the image forming apparatus to a video controller, and the video controller identifies a state change status in the image forming apparatus based on the notified information.

In a case where the engine control unit and the video controller can constantly communicate with each other using the method discussed in Japanese Patent Application Laid-Open No. 9-185294, it is feasible to realize a real-time sharing of a state change occurring in the image forming apparatus. However, a recent image forming apparatus is operable in a power saving mode in which the standby power consumption is 1 W or less. To reduce the entire standby power consumption in the power saving mode, the image forming apparatus prevents the engine control unit and the video controller from communicating with each other. Thus, synchronizing the engine control unit with the video controller is difficult in such a communication interrupted state. For example, it is assumed that the operational mode shifts to the power saving mode in a state where the status of a paper feeding cassette is detected. Then, the paper feeding cassette is removed from the image forming apparatus during the power saving mode and then the paper feeding cassette is attached again to the image forming apparatus. In such a case, if the image forming apparatus terminates operating in the power saving mode, it will be only determined that the status of the paper feeding cassette is present. In other words, there is an issue that a state change of the paper feeding cassette may not be detected if the paper feeding cassette has been attached to or detached from the image forming apparatus during the power saving mode.

CITATION LIST

Patent Literature

PTL 1: Japanese Patent Application Laid-Open No. 9-185294

SUMMARY OF INVENTION

The present invention is directed to control that enables an engine control unit and a video controller to share a state change occurring in an image forming apparatus in a state where communication between the engine control unit and the video controller is interrupted.

According to an aspect of the present invention, an image forming apparatus including an engine control unit which can communicate with a controller configured to control image information for performing image forming and is configured to control an image forming operation of an engine includes a storage unit configured to store information indicating a state change if it is detected that a communication interrupted state is changed from a state prior to the interruption of communication in a case where communication between the controller and the engine control unit is interrupted, wherein the engine control unit is configured to notify the controller of information relating to a state change of the image forming apparatus based on the information stored in the storage unit, when the communication between the controller and the engine control unit is resumed.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 8 is a table illustrating initial values of a state change status at an interruption timing of the communication between the video controller and the engine control unit.

FIG. 9A is a time chart illustrating an example of the communication states between the video controller and the engine control unit and change of each status, according to the second exemplary embodiment of the present invention.

FIG. 9B is a time chart illustrating an example of the communication states between the video controller and the engine control unit and change of each status, according to the second exemplary embodiment of the present invention.

DESCRIPTION OF EMBODIMENTS

Various exemplary embodiments, features, and aspects of the invention will be described in detail below with reference to the drawings.

The present invention is not intended to be limited to the following exemplary embodiments. It should be understood that the present invention is not limited to require all of combinations of characteristic features described in the following exemplary embodiments.

EXAMPLE 1

Figure 1:
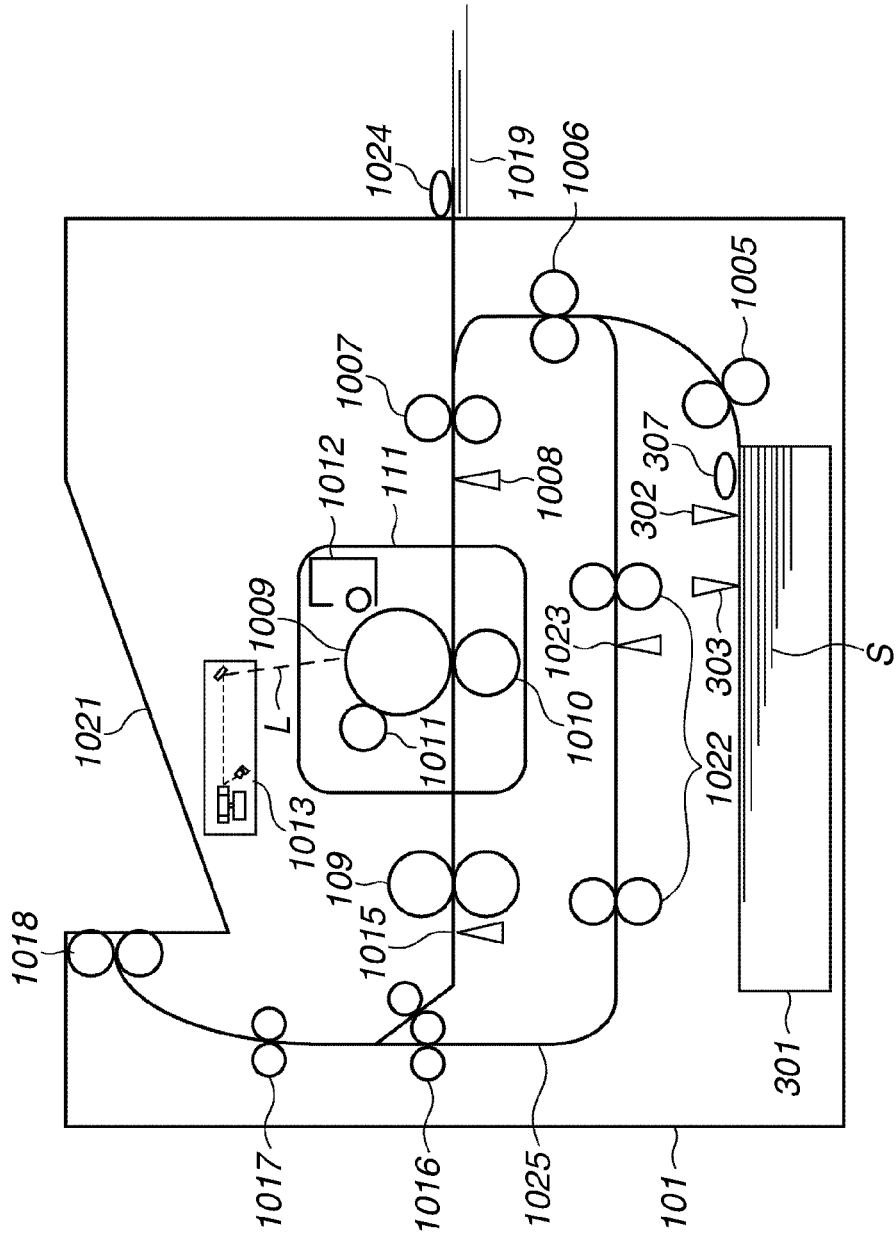
FIG. 1 is a schematic view illustrating an image forming apparatus according to an exemplary embodiment of the present invention.

FIG. 1 illustrates a schematic configuration of an image forming apparatus according to a first exemplary embodiment. If a laser beam printer 101 serving as an image forming apparatus receives a print instruction from a video controller 102 illustrated in FIG. 2, the laser beam printer 101 feeds a recording material S from a paper feeding cassette 301. More specifically, to feed the recording material S from the paper feeding cassette 301, the laser beam printer 101 drives a paper feeding roller 307 that can send the recording material S toward a conveyance path. Further, the laser beam printer 101 drives conveyance rollers 1005 and conveyance rollers 1006 to convey the recording material S to registration rollers 1007. Subsequently, a top sensor 1008 detects a leading edge of the recording material S. The recording material S is conveyed to an image formation unit 111. During a continuous print operation, the image forming apparatus performs control to feed the next recording material S after a predetermined time has elapsed since the leading or trailing edge of the preceding recording material S is detected by the top sensor 1008, in such a way as to attain a required throughput.

The image formation unit 111 includes a photosensitive drum 1009, a transfer roller 1010, a charging roller 1011, and a developing device 1012. After the photosensitive drum 1009 is uniformly charged by the charging roller 1011, a laser exposure device 1013 irradiates the photosensitive drum 1009 with a laser beam L according to a VIDEO signal 107 illustrated in FIG. 2 to form an electrostatic latent image on the surface of the photosensitive drum 1009. The developing device 1012 visualizes a toner image by applying toner to the electrostatic latent image having been formed as described above. Then, the photosensitive drum 1009 rotates to convey the toner image to a transfer position. The recording material S is also conveyed to the transfer position in synchronization with the rotation of the photosensitive drum 1009.

At the transfer position, the voltage having a polarity opposite to the toner image is applied to the transfer roller 1010, and the toner image is transferred from the photosensitive drum 1009 to the recording material S. After the toner image is transferred onto the recording material S, the recording material S is conveyed to the fixing control unit 109. Then, the toner image is fixed to the recording material S under application of heat and pressure. The recording material S carrying the toner image is further conveyed via triple rollers 1016, intermediate discharge rollers 1017, and discharge rollers 1018, and then discharged to a discharge tray 1021. Thus, a sequence of print operations is finished. An engine control unit 103 controls the above-described sequential print operation. Although the above-described image forming apparatus is a monochrome type, the present invention can be also applied to a color image forming apparatus.

Figure 2:
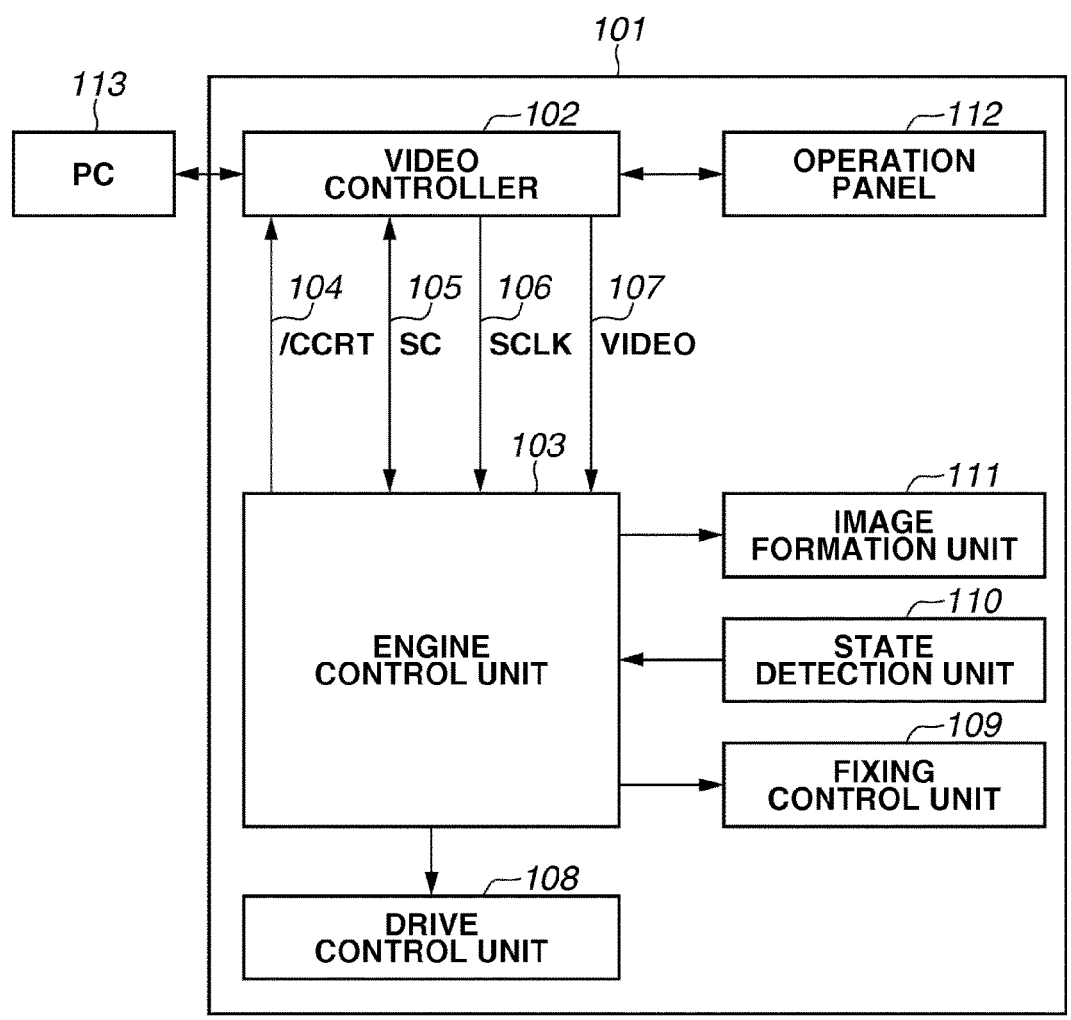
FIG. 2 is a block diagram illustrating a control system that includes a hardware configuration and related functions that can control operations to be performed by the image forming apparatus.

FIG. 2 is a block diagram illustrating a control system that includes a hardware configuration and related functions that can control operations to be performed by the image forming apparatus. The engine control unit 103 includes a calculation processing circuit, a read only memory (ROM), and a random access memory (RAM). The engine control unit 103 can realize various operations based on a program stored beforehand in the ROM. Further, the engine control unit 103 can perform printing in response to a print instruction or image information received from the video controller 102. If the engine control unit 103 receives a print instruction from the video controller 102, to control an image forming operation, the engine control unit 103 outputs operational instructions to a drive control unit 108, the image formation unit 111, and the fixing control unit 109, respectively. The drive control unit 108 performs driving control for respective units in the image forming apparatus. The image formation unit 111 performs image formation based on image data included in the VIDEO signal 107. The fixing control unit 109 controls a fixing device that fixes an image formed on a recording material. A state detection unit 110 is associated with sensors that can detect an operational state of each unit in the image forming apparatus. The engine control unit 103 detects the operational state of each unit in the image forming apparatus based on an input signal that represents a detection result of the state detection unit 110.

The video controller 102 can communicate with each of a personal computer (PC) 113, an operation panel 112, and the engine control unit 103. The PC 113 is provided outside the laser beam printer 101. The operation panel 112 enables users to perform various operations or displays an operational state of the laser beam printer 101. The video controller 102 outputs an SCLK signal 106 as a synchronization clock signal for the communication to be performed between the video controller 102 and the engine control unit 103. The video controller 102 outputs an SC signal 105 as a data signal to transmit and receive data in synchronization with the SCLK signal 106. The engine control unit 103 outputs a /CCRT signal 104 as a state change notification signal for notifying the video controller 102 of a state change having occurred in the image forming apparatus.

Figure 3:
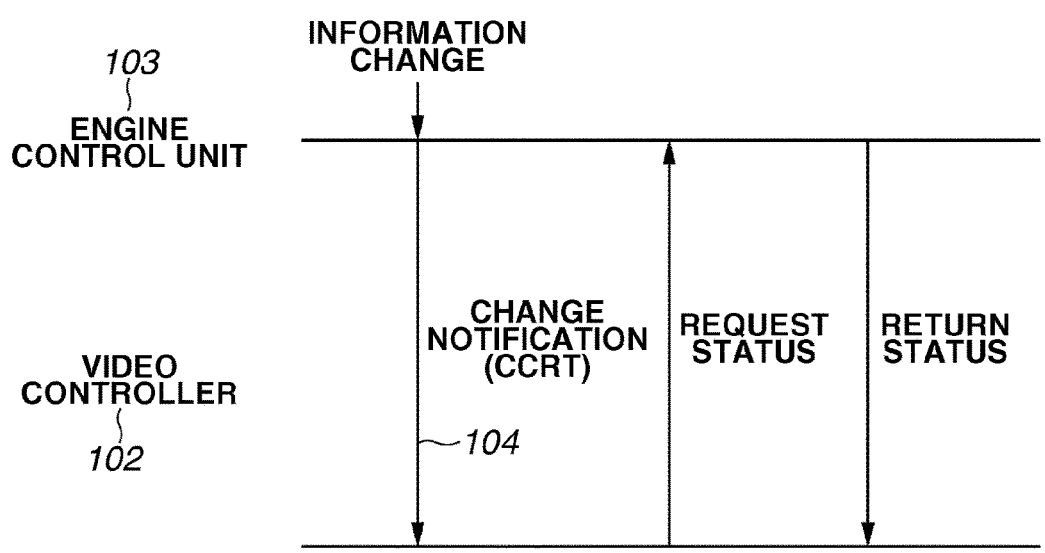
FIG. 3 illustrates an example of communication states that can be performed between an engine control unit and a video controller.

FIG. 3 illustrates an example of the communication states between the engine control unit 103 and the video controller 102. A method for notifying the video controller 102 of a state change having occurred in the image forming apparatus when the state change is detected by the engine control unit 103 is described below. If the state detection unit 110 detects a state change having occurred in the image forming apparatus, the state detection unit 110 notifies the engine control unit 103 of the detected change. Upon receiving the state change information, the engine control unit 103 changes a status value according to the received information. If the engine control unit 103 receives a state change having occurred in the image forming apparatus, such as attachment/detachment of the paper feeding cassette 301 or open/close of a door, the engine control unit 103 transmits the /CCRT signal 104 notifying the video controller 102 of the occurrence of the state change.

When the video controller 102 receives the /CCRT signal 104 notifying the state change having occurred in the image forming apparatus, the video controller 102 requests the engine control unit 103 to transmit the present status of the image forming apparatus. Then, the video controller 102 requests the engine control unit 103 to notify a changed status of the image forming apparatus. The controller 102 rewrites the status of the image forming apparatus stored therein into information synchronized with the engine control unit 103. As described above, the engine control unit 103 transmits information to the video controller 102 if a state change has occurred in the image forming apparatus so that the state of the image forming apparatus can be shared between the video controller 102 and the engine control unit 103.

Figure 4:
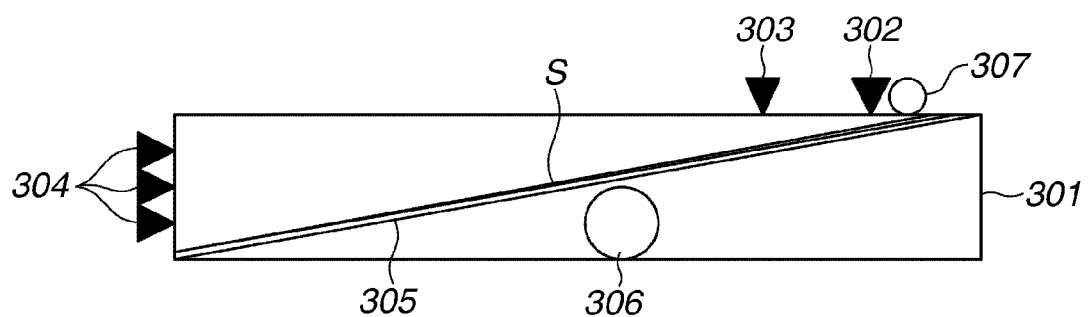
FIG. 4 illustrates a schematic configuration of a paper feeding cassette.

Next, a specific example of the status change in the image forming apparatus is described below with reference to the paper feeding cassette 301. FIG. 4 illustrates a schematic configuration of the paper feeding cassette 301. If the paper feeding cassette 301 is inserted into the image forming apparatus, a recording material size sensor 304 detects the insertion of the paper feeding cassette 301. In addition to the detection of the inserted paper feeding cassette, the recording material size sensor 304 detects the size of the recording material S stored in the paper feeding cassette 301 based on a combination of outputs from a plurality of sensors that constitute the recording material size sensor 304.

If it is determined that the paper feeding cassette is present by the recording material size sensor 304, then it is confirmed whether a sheet surface of the recording material S is detected by a sheet surface sensor 302. If it is determined that the sheet surface is not present, the laser beam printer 101 activates a lifter motor 306 to drive a cassette intermediate plate 305 so as to perform a lift-up operation so that the recording material S can be detected by the sheet surface sensor 302. If the recording material S is detected by the sheet surface sensor 302, it means that the recording material S is lifted up to a position where the recording material S can be fed into the laser beam printer 101. If the recording material S is detected by the sheet surface sensor 302 during the lift-up operation and it is determined that the sheet surface is present, the laser beam printer 101 stops lifting the cassette intermediate plate 305 upward. Then, the laser beam printer 101 confirms a detection value output from a paper presence sensor 303. If a print instruction is received from the video controller 102 in a state where the recording material S is detected by the paper presence sensor 303 and it is determined that the paper is present, the laser beam printer 101 drives the paper feeding roller 307 to feed the recording material S.

If the inserted paper feeding cassette 301 is pulled out from the image forming apparatus, the cassette intermediate plate 305 performs a lift-down operation. The engine control unit 103 stores a detection result indicating the presence of the paper feeding cassette, a detection result indicating the size of the recording material, and a detection result indicating the presence of the paper, respectively, as the status of the paper feeding cassette 301. If any change occurs in the above-described statuses, the engine control unit 103 notifies the video controller 102 of the generated status change. Upon receiving the notification informing the generated status change, the video controller 102 acquires detail contents of the generated status change to update the contents of the changed status.

Figure 5:
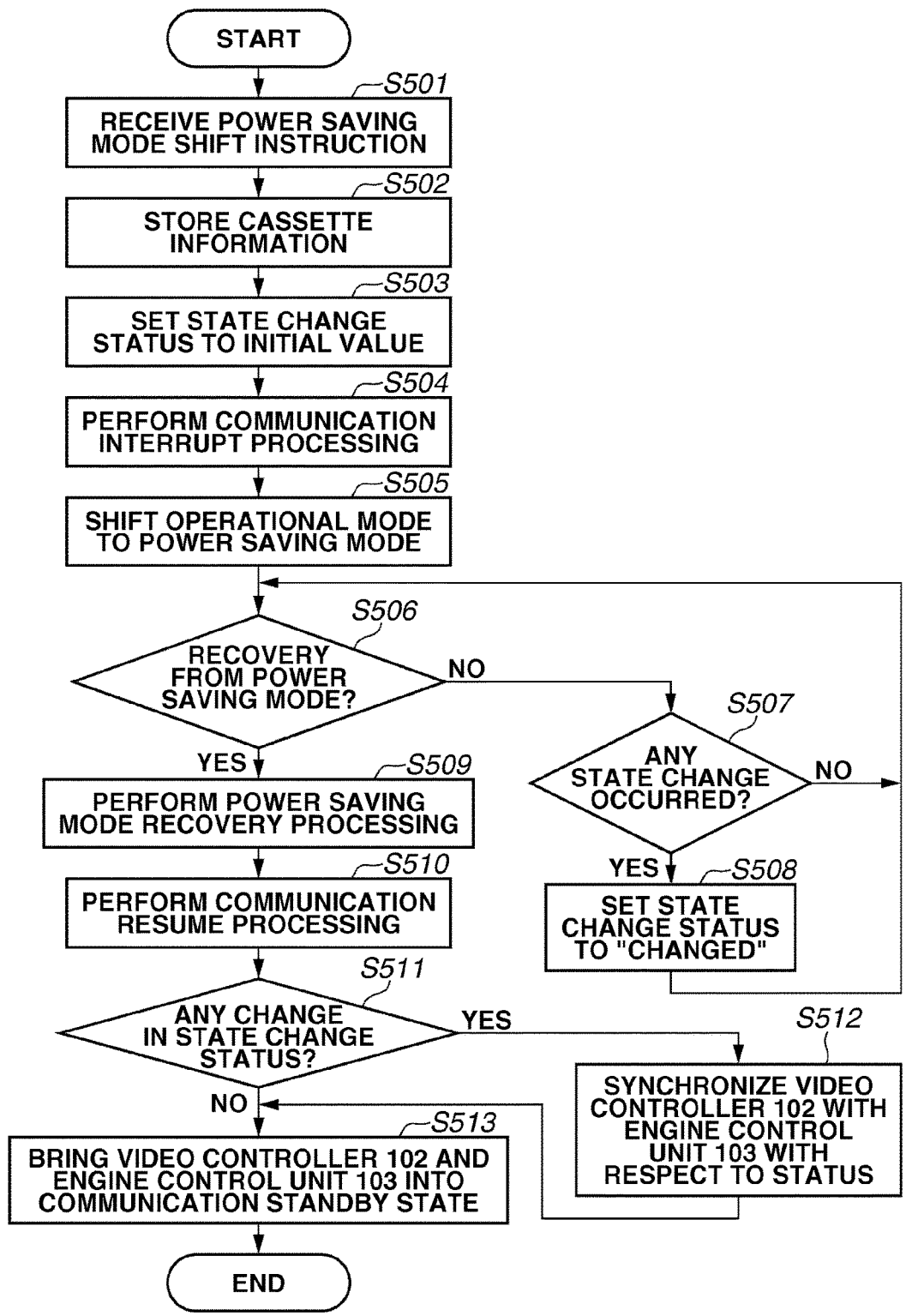
FIG. 5 is a flowchart illustrating communication performed between the video controller and the engine control unit according to a first exemplary embodiment of the present invention.

FIG. 5 is a flowchart illustrating communication performed between the video controller 102 and the engine control unit 103 according to the present exemplary embodiment. In step S501, the video controller 102 transmits a power saving mode shift instruction to the engine control unit 103 in response to a user instruction or a shifting to a power saving mode instructed by a real-time clock of the video controller 102. If the engine control unit 103 receives the power saving mode shift instruction from the video controller 102, then in step S502, the engine control unit 103 stores information obtained from each sensor of a paper feeding unit.

In step S503, the engine control unit 103 sets a state change status to an initial value. The state change status is a status that stores a state change having occurred in the image forming apparatus during a period when the communication between the engine control unit 103 and the video controller 102 is interrupted in the power saving mode. According to the present exemplary embodiment, the engine control unit 103 can confirm a change detected by the sensor of the paper feeding cassette 301 even in the power saving mode. Therefore, the engine control unit 103 sets "no change" as the initial value of the state change status. In step S504, the engine control unit 103 performs processing for interrupting the communication with the video controller 102. In step S505, the engine control unit 103 stops a power source that is unnecessary in the power saving mode and shifts the operational mode to the power saving mode.

In step S506, the engine control unit 103 checks whether a recovery instruction is issued that instructs recovery from the power saving mode to a normal mode. For example, if a power source SW is operated by a user, the recovery instruction from the power saving mode can be issued.

If it is determined that the recovery instruction from the power saving mode is not present (NO in step S506), then in step S507, the engine control unit 103 compares the information obtained by each sensor of the paper feeding unit and stored in step S502 with the current information obtained by each sensor of the paper feeding unit to determine whether any state change has occurred in the paper feeding cassette 301. If it is determined that the state change has occurred in the paper feeding cassette 301 (YES in step S507), then in step S508, the engine control unit 103 changes the state change status from "no change" to "changed". If it is determined that there is not any state change of the paper feeding cassette 301 (NO in step S507), the operation returns to step S506.

In step S506, if it is determined that the recovery instruction from the power saving mode is present (YES in step S506), then in step S509, the engine control unit 103 performs recovery processing. The recovery processing includes processing for activating each power source and processing for resuming the operation of the state detection unit that has been interrupted in the power saving mode. Further, the engine control unit 103 causes each of the drive control unit 108, the image formation unit 111, and the fixing control unit 109 to resume their operations from the power saving mode to perform image formation. In step S510, the engine control unit 103 performs processing for restarting communication between the engine control unit 103 and the video controller 102.

In step S511, the video controller 102 determines whether there is any change in the state change status after restarting the communication with the engine control unit 103. If it is determined that there is a change in the state change status (YES in step S511), then in step S512, the video controller 102 inquires the engine control unit 103 about details of the change having occurred in a target member. Then, if the video controller 102 receives the details of the change from the engine control unit 103, the video controller 102 updates its internal status and synchronizes with the engine control unit 103 with respect to the state change in the image forming apparatus. On the other hand, if it is determined that there is not any change in the state change status (NO in step S511), then in step S513, the video controller 102 and the engine control unit 103 are brought into a communication standby state.

Figure 6:
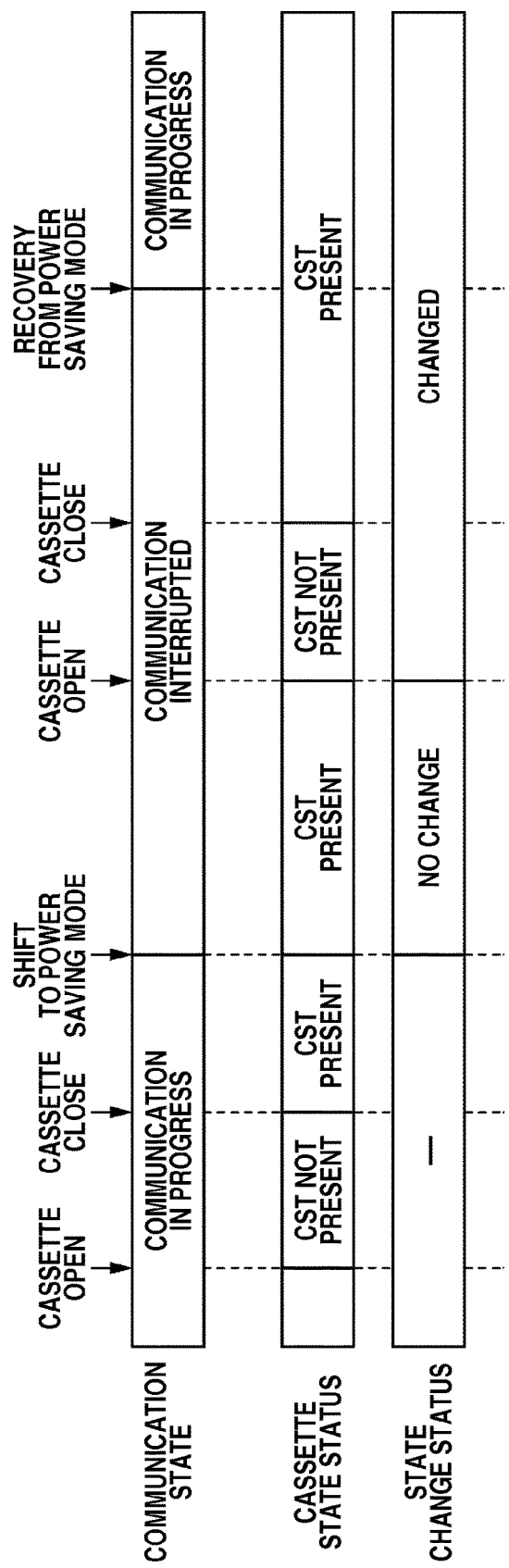
FIG. 6 is a time chart illustrating an example of the communication states between the video controller and the engine control unit and change of each status, according to the first exemplary embodiment of the present invention.

FIG. 6 is a time chart illustrating an example of the communication states between the video controller 102 and the engine control unit 103, and change of each status, according to the present exemplary embodiment of the present invention. In FIG. 6, a cassette state status indicates "CST present" before and after the interruption of communication. Accordingly, the video controller 102 cannot confirm the state of the paper feeding cassette 301 during the communication interrupted period, by confirming only the cassette state status, after completing the recovery from the communication interrupted state.

On the other hand, the state change status indicates that state change has occurred during the communication interrupted period. More specifically, in this example, the paper feeding cassette 301 has been opened, and the state change status has changed from "no change" to "changed". Even when the paper feeding cassette 301 is closed again, the state change status remains the same (i.e., "changed"). Thus, the video controller 102 can confirm the occurrence of the change in the paper feeding cassette 301 during the communication interrupted period by confirming the state change status after completing the recovery from the communication interrupted state. Then, the video controller 102 inquires the engine control unit 103 about detailed contents of the status change and can synchronize the video controller 102 with the engine control unit 103 with respect to the state change having occurred during the communication interrupted period.

As described above, the video controller 102 can recognize a status change having occurred during the period that the communication between the video controller 102 and the engine control unit 103 is interrupted, by referring to the state change status. Accordingly, the status change having occurred in the image forming apparatus during the communication interrupted period can be detected by confirming the state change status after completing the recovery from the communication interrupted state. Thus, even in such a situation that communication is interrupted, the video controller 102 and the engine control unit 103 can share a state change of the status. Further, since only a state of the status, such as "changed" or "no change", is saved as the state change status, the memory can be saved compared to a case where all of the state change history is stored.

According to the present exemplary embodiment, the paper feeding cassette 301 is described as a target to be checked to detect the state change status. However, the target to be checked to detect the state change status is not limited to the paper feeding cassette 301. For example, an open/close state of a door provided in the image forming apparatus or an attachment/detachment state of a discharge unit can be designated as a target. Further, the above-described method uses the wired signal line to notify the state change status. However, the notification method is not limited to the method using the wired signal line, and for example, a wireless communication is employable similarly. Further, the above-described communication unit uses a clock synchronous communication. However, the communication unit is not always required to use the clock synchronous communication. For example, a communication unit using a start-stop synchronous communication is also employable.

Further, in the control system described in the present exemplary embodiment, the video controller 102 inquires the engine control unit 103 about a detailed status after the state change status is notified from the engine control unit 103. However, the control system is not limited to the above-described example. For example, the engine control unit 103 can be configured to notify a detailed status after notifying the video controller 102 of the state change status even when no inquiry is received from the video controller 102.

EXAMPLE 2

In the above-described first exemplary embodiment, the control system stores one of two states, i.e., "changed" or "no change", as the state change status that indicates a state change having occurred in the image forming apparatus during a period when communication between the video controller 102 and the engine control unit 103 is interrupted. However, in a case where an occurrence of a state change cannot be detected in the power saving mode, surely identifying the state change before and after the communication interruption may be difficult. Hence, in a second exemplary embodiment, the control system is configured to store one of three states, i.e., "changed", "no change", or "change undefined", as the state change status during the communication interrupted period. An image forming apparatus according to the second exemplary embodiment has a configuration similar to that described in the first exemplary embodiment. The video controller 102 and the engine control unit 103 according to the second exemplary embodiment can perform communication using a method similar to that described in the first exemplary embodiment. Constituent components similar to those described in the first exemplary embodiment are denoted by the same reference numerals and their descriptions are not repeated.

Figure 7:
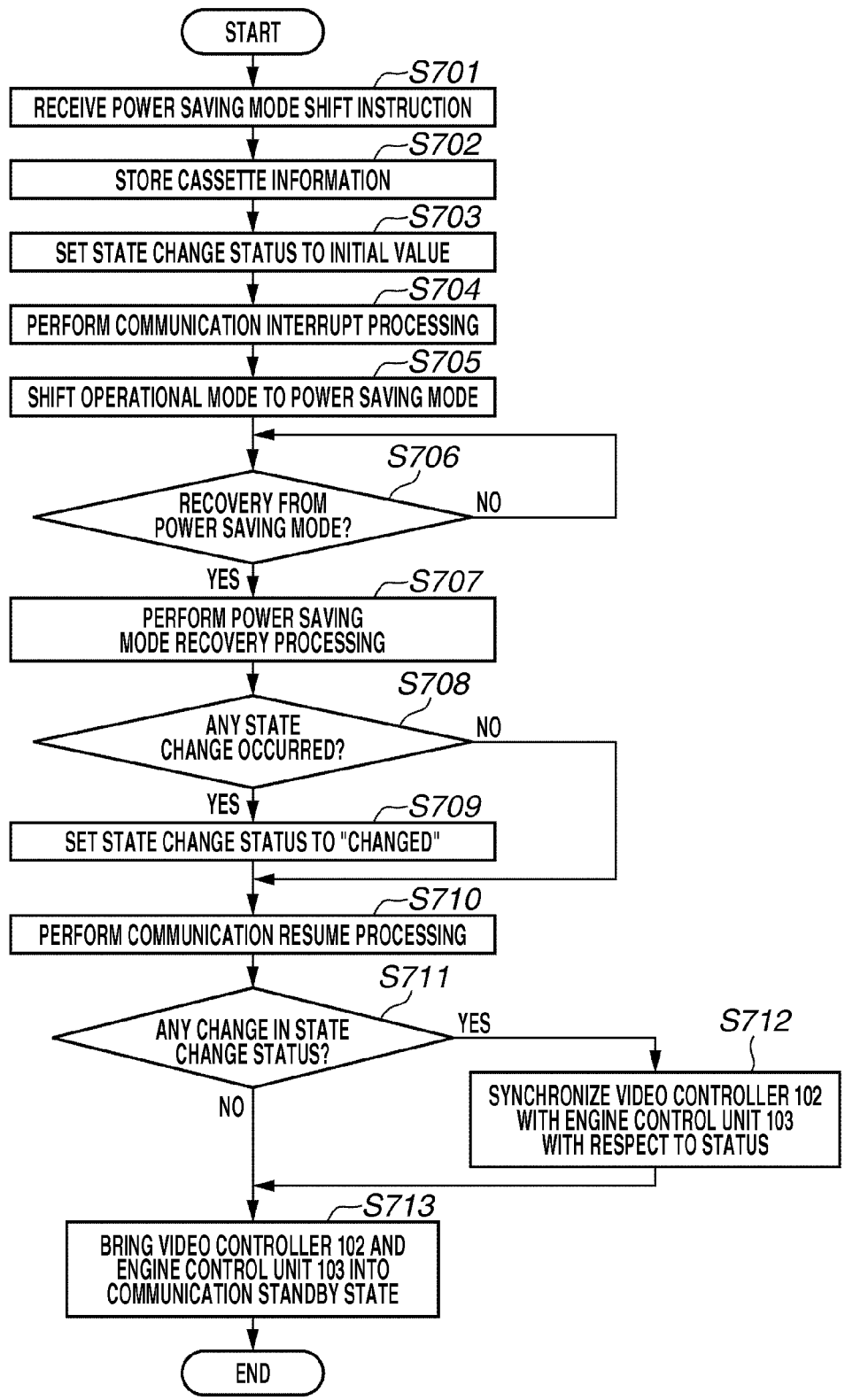
FIG. 7 is a flowchart illustrating communication performed between the video controller and the engine control unit according to a second exemplary embodiment of the present invention.

FIG. 7 is a flowchart illustrating communication performed between the video controller 102 and the engine control unit 103 according to the present exemplary embodiment. In step S701, the video controller 102 transmits the power saving mode shift instruction to the engine control unit 103 in response to a user instruction or a shifting to the power saving mode instructed by the real-time clock of the video controller 102. If the engine control unit 103 receives the power saving mode shift instruction from the video controller 102, then in step S702, the engine control unit 103 stores information obtained from each sensor of the paper feeding unit.

In step S703, the engine control unit 103 sets the state change status to an initial value. The state change status is a status that stores a state change having occurred in the image forming apparatus during a period when the communication between the engine control unit 103 and the video controller 102 is interrupted in the power saving mode. According to the present exemplary embodiment, the engine control unit 103 cannot confirm a change detected by the sensor of the paper feeding cassette 301 in the power saving mode. Therefore, the engine control unit 103 sets "no change" or "undefined" as the initial value of the state change status, as illustrated in FIG. 8. In step S704, the engine control unit 103 performs processing for interrupting the communication with the video controller 102. In step S705, the engine control unit 103 stops a power source that is unnecessary in the power saving mode and shifts the operational mode to the power saving mode.

In step S706, the engine control unit 103 checks whether a recovery instruction is issued that instructs recovery from the power saving mode to the normal mode. For example, if a power source SW is operated by a user, the recovery instruction from the power saving mode can be issued. Thus, the engine control unit 103 monitors the recovery instruction until the operational mode is recovered from the power saving mode. If it is determined that the recovery instruction from the power saving mode is present (YES in step S706), then in step S707, the engine control unit 103 performs recovery processing. The recovery processing includes processing for activating each power source and processing for resuming the operation of the state detection unit that has been interrupted in the power saving mode. Further, the engine control unit 103 causes each of the drive control unit 108, the image formation unit 111, and the fixing control unit 109 to resume their operations from the power saving mode to perform image formation.

In step S708, the engine control unit 103 compares the information obtained by each sensor of the paper feeding unit and stored in step S702 with the current information obtained by each sensor of the paper feeding unit to determine whether any state change has occurred in the paper feeding cassette 301. If it is determined that the state change has occurred in the paper feeding cassette 301 (YES in step S708), then in step S709, the engine control unit 103 changes the state change status from "no change" to "changed". If it is determined that there is not any state change of the paper feeding cassette 301 (NO in step S708), the engine control unit 103 does not change the state change status.

In step S710, the engine control unit 103 performs processing for restarting communication between the engine control unit 103 and the video controller 102. In step S711, the video controller 102 determines whether there is any change in the state change status after restarting the communication with the engine control unit 103. If it is determined that there is a change in the state change status (YES in step S711), then in step S712, the video controller 102 inquires the engine control unit 103 about details of the change having occurred in a target member. Then, if the video controller 102 receives the details of the change from the engine control unit 103, the video controller 102 updates its internal status and synchronizes with the engine control unit 103 with respect to the state change in the image forming apparatus.

On the other hand, if it is determined that there is not any change in the state change status (NO in step S711), then in step S713, the video controller 102 and the engine control unit 103 are brought into the communication standby state. Further, if it is determined that the state change status is undefined, the video controller 102 selects to cause the operation panel 112 to display a message that prompts a user to designate again the settings of the image forming apparatus or to perform an operation in the state prior to the shifting to the power saving mode. Then in step S713, the video controller 102 and the engine control unit 103 are brought into the communication standby state.

FIG. 8 is a table illustrating initial values of the state change status at an interruption timing of the communication between the video controller 102 and the engine control unit 103. The initial value of the state change status at the communication interruption timing is dependent on the state of each target sensor at the communication interruption timing. For example, the state of the paper feeding cassette 301 is determined by a detection result of the paper feeding cassette 301 by the recording material size sensor 304. The sheet surface detection state is determined by a detection result of a sheet surface by the sheet surface sensor 302. The paper presence detection state is determined by a detection result of a recording material obtained by the paper presence sensor 303. A method for setting the initial value of the state change status is described below.

A setting 801 is employable in a state where the cassette is not present. In this case, the state change status can be determined by referring to only the presence or absence of the cassette. The initial value of the state change status is set to "no change". A setting 802 is employable in a state before the lift-up operation. In this case, if the type of the recording material is changed while maintaining the paper size at the same value during the communication interrupted period, the change of the recording material cannot be detected. Accordingly, the initial value of the state change status is set to "undefined". A setting 803 is employable in a state where the lift-up operation is in progress. In this case, similar to the above-described setting 802, if the type of the recording material is changed while maintaining the paper size at the same value during the communication interrupted period, the change of the recording material cannot be detected. Accordingly, the initial value of the state change status is set to "undefined".

A setting 804 is employable in a state where the lift-up operation has been completed and no presence of paper in the cassette is confirmed. In this case, if the paper feeding cassette 301 is opened during the communication interrupted period, the intermediate plate moves downward and the sheet surface sensor 302 does not output any signal. Accordingly, the open/close state of the paper feeding cassette 301 can be detected, and the initial value of the state change status is set to "no change". A setting 805 is employable in a state where the lift-up operation has been completed and the presence of paper in the cassette is confirmed. In this case, similar to the above-described setting 804, if the paper feeding cassette 301 is opened during the communication interrupted period, the intermediate plate moves downward and the sheet surface sensor 302 does not output any signal. Accordingly, the open/close state of the paper feeding cassette 301 can be detected, and the initial value of the state change status is set to "no change".

Figure 9C:
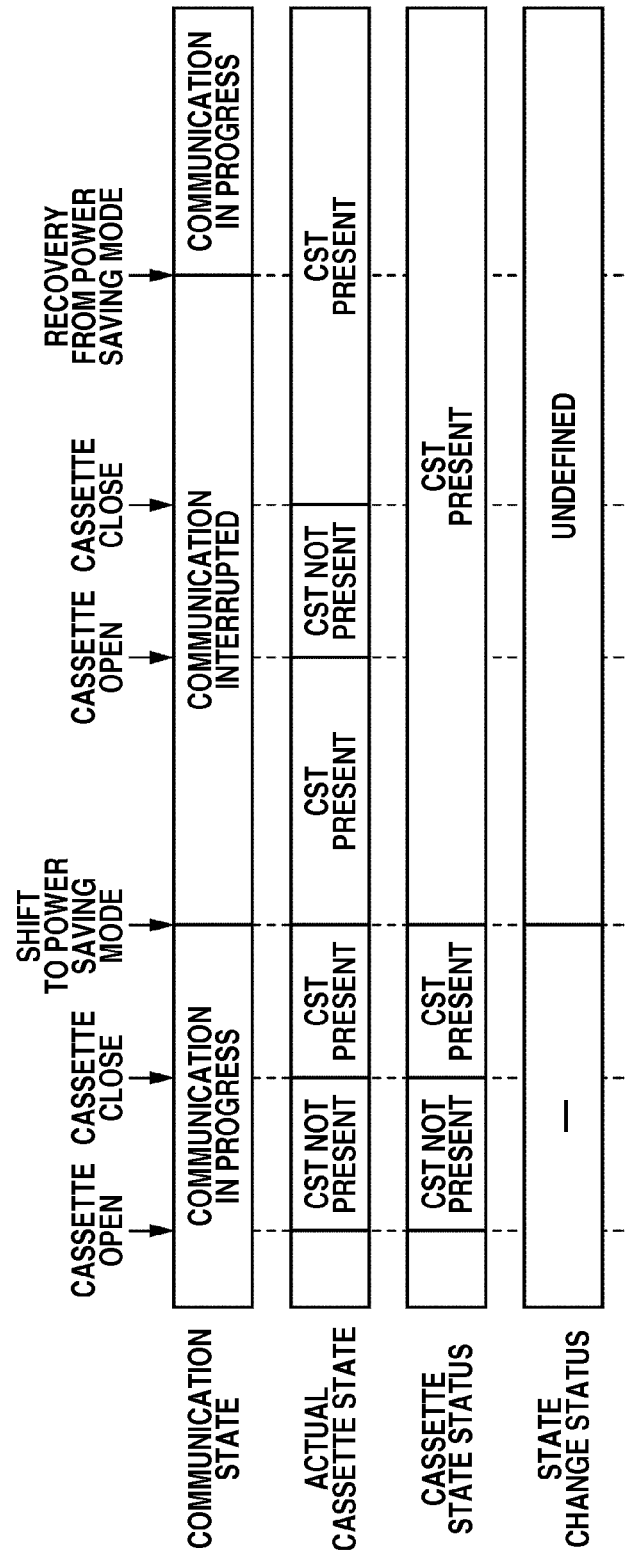
FIG. 9C is a time chart illustrating an example of the communication states between the video controller and the engine control unit and change of each status, according to the second exemplary embodiment of the present invention.

FIGS. 9A to 9C are time charts illustrating examples of the communication states between the video controller 102 and the engine control unit 103 and change of each status, according to the present exemplary embodiment. FIG. 9A illustrates a case where the initial value of the state change status is "no change" and the state change status can be determined after completing the recovery from the communication interrupted state. FIG. 9B illustrates a case where the initial value of the state change status is "undefined" and the state change status can be determined after completing the recovery from the communication interrupted state. FIG. 9C illustrates a case where the initial value of the state change status is "undefined" and the state change status cannot be determined after completing the recovery from the communication interrupted state.

In FIG. 9A, the cassette state status remains the same value (i.e., "CST present") before and after the communication interrupt. As described in the settings 804 and 805, if the paper feeding cassette 301 is opened, the intermediate plate moves downward. Thus, the state change can be detected in this case. In FIG. 9B, similar to FIG. 9A, if the paper feeding cassette 301 is opened, the intermediate plate moves downward. Thus, the state change can be detected in this case. On the other hand, in FIG. 9C, the paper feeding cassette 301 is opened during the communication interrupted period. As described in the settings 802 and 803, if the operational mode shifts to the power saving mode during the lift-up operation of the paper feeding cassette 301 and the paper feeding cassette 301 is opened in this state, the state change having occurred in the paper feeding cassette 301 cannot be detected at the recovery timing. Thus, the opening of the paper feeding cassette 301 during the communication interrupted period cannot be detected at the timing the communication resumes from the interrupted state. Accordingly, the state change status remains the same value (i.e., "undefined"). The video controller 102 causes the operation panel 112 to display a message that prompts a user to designate again the settings of the image forming apparatus or performs an operation in the state prior to the shifting to the power saving mode.

As described above, the video controller 102 can recognize a status change having occurred during the period that the communication between the video controller 102 and the engine control unit 103 is interrupted, by referring to the state change status. Accordingly, the status change having occurred in the image forming apparatus during the communication interrupted period can be detected by confirming the state change status after completing the recovery from the communication interrupted state. Thus, even in such a situation that communication is interrupted, the video controller 102 and the engine control unit 103 can share a state change of the status. Further, it is feasible to prompt a user to perform settings again.

According to the present exemplary embodiment, the paper feeding cassette 301 is described as a target to be checked to detect the state change status. However, the target to be checked to detect the state change status is not limited to the paper feeding cassette 301. For example, an open/close state of a door provided in the image forming apparatus or an attachment/detachment state of a discharge unit can be designated as a target. Further, the above-described method uses the wired signal line to notify the state change status. However, the notification method is not limited to the method using the wired signal line, and for example, a wireless communication is employable similarly. Further, the above-described communication unit uses a clock synchronous communication. However, the communication unit is not always required to use the clock synchronous communication. For example, a communication unit using a start-stop synchronous communication is also employable.

Further, in the control system described in the present exemplary embodiment, the video controller 102 inquires the engine control unit 103 about a detailed status after the state change status has been notified from the engine control unit 103. However, the control system is not limited to the above-described example. For example, the engine control unit 103 can be configured to notify a detailed status after notifying the video controller 102 of the state change status even when no inquiry is received from the video controller 102.

EXAMPLE 3

In the above-described first exemplary embodiment, the control system stores one of two states, i.e., "changed" or "no change", as the state change status that indicates a state change having occurred in the image forming apparatus during a period when communication between the video controller 102 and the engine control unit 103 is interrupted.

Further, in the above-described second exemplary embodiment, the control system stores one of three states, i.e., "changed", "no change", or "undefined", as the state change status that indicates a state change having occurred in the image forming apparatus when the communication between the video controller 102 and the engine control unit 103 is interrupted. However, in the above-described exemplary embodiments, the target to be checked to detect the state change status is determined beforehand. Hence, in a third exemplary embodiment, the control system is configured to enable a user to designate a target to be checked to detect the state change status. An image forming apparatus according to the third exemplary embodiment has a configuration similar to that described in the first exemplary embodiment. The video controller 102 and the engine control unit 103 according to the third exemplary embodiment can perform communication using a method similar to that described in the first exemplary embodiment. Constituent components similar to those described in the first exemplary embodiment are denoted by the same reference numerals and their descriptions are not repeated.

Figure 10:
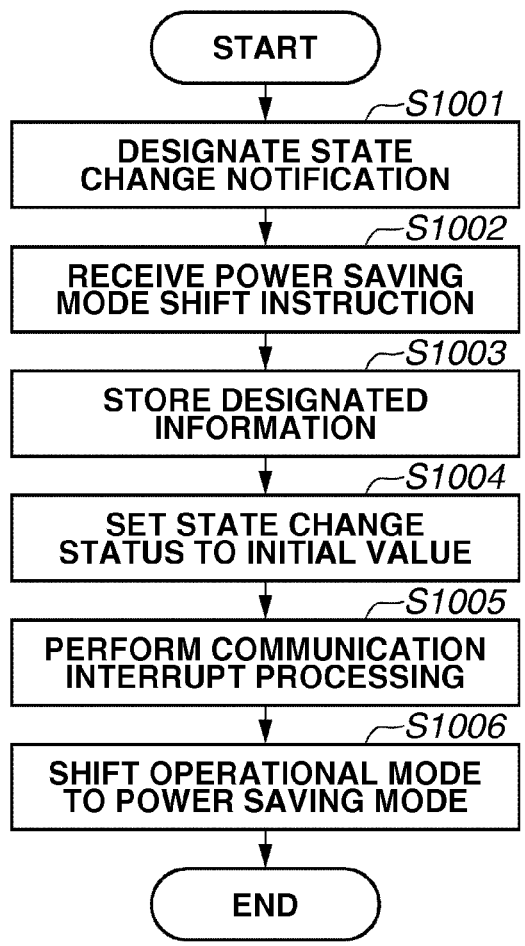
FIG. 10 is a flowchart illustrating communication performed between the video controller and the engine control unit according to a third exemplary embodiment of the present invention.

FIG. 10 is a flowchart illustrating communication performed between the video controller 102 and the engine control unit 103 according to the present exemplary embodiment. According to the present exemplary embodiment, the control system enables a user to preliminarily designate a target member to be checked to detect a state change from the video controller 102 during the communication interrupted period. In step S1001, the video controller 102 notifies the engine control unit 103 of the designated target member to be checked to detect a state change during the communication interrupted period.

In step S1002, the video controller 102 transmits the power saving mode shift instruction to the engine control unit 103 in response to a user instruction or a shifting to the power saving mode instructed by the real-time clock of the video controller 102. If the engine control unit 103 receives the power saving mode shift instruction from the video controller 102, then in step S1003, the engine control unit 103 stores the current information of the member designated in step S1001.

In step S1004, the engine control unit 103 sets the state change status to an initial value. The state change status is a status that stores a state change having occurred in the image forming apparatus during a period when the communication between the engine control unit 103 and the video controller 102 is interrupted in the power saving mode. The initial value setting method according to the present exemplary embodiment is similar to the method described in the first exemplary embodiment (see step S503) or the method described in the second exemplary embodiment (see step S703).

In step S1005, the engine control unit 103 performs processing for interrupting the communication with the video controller 102. In step S1006, the engine control unit 103 stops a power source that is unnecessary in the power saving mode and shifts the operational mode to the power saving mode. The control after shifting the power saving mode, i.e., processing following the step S1006, is performed using the method described in the first exemplary embodiment (see steps S506 to S513), or the method described in the second exemplary embodiment (see steps S706 to S713).

As described above, the video controller 102 can recognize a status change having occurred during the period that the communication between the video controller 102 and the engine control unit 103 is interrupted, by referring to the state change status. Further, a user can select a target member to be checked to detect the state change status. Thus, a user's intention can be taken into consideration in performing the state detection processing.

According to the present exemplary embodiment, the above-described method uses the wired signal line to notify the state change status. However, the notification method is not limited to the method using the wired signal line, and for example, a wireless communication is employable similarly. Further, the above-described communication unit uses a clock synchronous communication. However, the communication unit is not always required to use the clock synchronous communication. For example, a communication unit using a start-stop synchronous communication is also employable.

Further, in the control system described in the present exemplary embodiment, the video controller 102 inquires the engine control unit 103 about a detailed status after the state change status has been notified from the engine control unit 103. However, the control system is not limited to the above-described example. For example, the engine control unit 103 can be configured to notify a detailed status after notifying the video controller 102 of the state change status even when no inquiry is received from the video controller 102.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2011-230003, filed Oct. 19, 2011, which is hereby incorporated by reference herein in its entirety.

The invention claimed is:

1. An image forming apparatus comprising:
   an engine control unit configured to control an image forming operation and to communicate with a controller which controls image information for performing image forming, wherein a communication between the engine control unit and the controller is able to be interrupted; and
   a storage unit configured to store information relating to a state change of the image forming apparatus during interruption of the communication between the engine control unit and the controller, wherein the stored information includes first information which indicates the state change of the image forming apparatus has occurred during the interruption, or second information which indicates the state change of the image forming apparatus has not occurred during the interruption,
   wherein the engine control unit and the storage unit communicate with each other by being coupled,
   wherein, in a case where the communication between the controller and the engine control unit is recovered from the interruption, the engine control unit notifies the controller of the first information or the second information, and
   wherein, in a case where the engine control unit notifies the controller of the first information, the controller inquires the engine control unit about a state of the image forming apparatus after the recovery from the interruption, and in a case where the engine control unit notifies the controller of the second information, the controller does not inquire the engine control unit about the state of the image forming apparatus after the recovery from the interruption.

2. The image forming apparatus according to claim 1, wherein, in a case where the controller is notified by the first information, the engine control unit is configured to receive a request from the controller to notify the state of the image forming apparatus after the recovery from the interruption.

3. The image forming apparatus according to claim 2, wherein, in response to the request from the controller, the engine control unit detects the state of the image forming apparatus after the recovery from the interruption, and notifies the state of the image forming apparatus after the recovery from the interruption.

4. The image forming apparatus according to claim 1, wherein the engine control unit determines whether the state change of the image forming apparatus has occurred during the interruption of the communication based on the stored information, and, upon detection of the state of the image forming apparatus after the recovery from the interruption, the engine control unit notifies the controller of the state of the image forming apparatus after the recovery from the interruption.

5. The image forming apparatus according to claim 1, wherein, in a case where an operational mode is shifted to a power saving mode, communication between the controller and the engine control unit is interrupted.

6. The image forming apparatus according to claim 1, further comprising the controller,
   wherein, in the case where it is detected, while communication between the controller and the engine control unit is interrupted, that a state of the image forming apparatus during interruption of communication is changed from a state prior to the interruption of the communication, third information configured to be stored in the storage unit further includes an undefined status indicating that presence or absence of the state change cannot be identified, and
   wherein, in a case where the controller is notified of the third information, the controller is configured to (i) request a user to designate settings of the image forming apparatus or (ii) determine that the image forming apparatus is in a state prior to the interruption of communication.

7. The image forming apparatus according to claim 1, further comprising the controller,
   wherein the controller is configured to designate, in advance, an item of the image forming apparatus as a member to be checked to detect a state change when communication is interrupted with respect to the engine control unit.

8. The image forming apparatus according to claim 7, wherein the item of the image forming apparatus as a member to be checked includes at least one of attachment/detachment of a paper feeding cassette and open/close of a door.

9. An image forming apparatus comprising:
   a second control unit configured to control an image forming operation and to communicate with a first control unit which controls image information for performing image forming, wherein a communication between the second control unit and the first control unit is able to be interrupted; and
   a storage unit configured to store information relating to a state change of the image forming apparatus during interruption of the communication between the second control unit and the first control unit, wherein the stored information includes first information which indicates the state change of the image forming apparatus has occurred during the interruption, or second information which indicates the state change of the image forming apparatus has not occurred during the interruption, wherein the second control unit and the storage unit communicate with each other by being coupled, wherein, in a case where the communication between the first control unit and the second control unit is recovered from the interruption, the second control unit notifies the first control unit of the first information or the second information, and wherein, in a case where the second control unit notifies the first control unit of the first information, the first control unit inquires the second control unit about a state of the image forming apparatus after the recovery from the interruption, and in a case where the second control unit notifies the first control unit of the second information, the first control unit does not inquire the second control unit about the state of the image forming apparatus after the recovery from the interruption.

* * * * *